US012463568B2

(12) United States Patent
Fleischer et al.

(10) Patent No.: US 12,463,568 B2
(45) Date of Patent: Nov. 4, 2025

(54) ELECTRICAL TRANSMISSION SYSTEM FOR FLEXIBLE CONSUMERS

(71) Applicant: Siemens Energy Global GmbH & Co. KG, Munich (DE)

(72) Inventors: Maximilian Fleischer, Höhenkirchen (DE); Thomas Thiemann, Recklinghausen (DE); Alexander Rentschler, Bensheim (DE)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 0 days.

(21) Appl. No.: 18/695,028

(22) PCT Filed: Oct. 6, 2022

(86) PCT No.: PCT/EP2022/077798
§ 371 (c)(1),
(2) Date: Mar. 25, 2024

(87) PCT Pub. No.: WO2023/057559
PCT Pub. Date: Apr. 13, 2023

(65) Prior Publication Data
US 2024/0396479 A1 Nov. 28, 2024

(30) Foreign Application Priority Data
Oct. 7, 2021 (EP) .................................. 21201519

(51) Int. Cl.
H02P 9/02 (2006.01)
H02J 3/38 (2006.01)
(52) U.S. Cl.
CPC ............... *H02P 9/02* (2013.01); *H02J 3/381* (2013.01); *H02J 2300/24* (2020.01); *H02J 2300/28* (2020.01)

(58) Field of Classification Search
CPC ..... H02P 9/02; H02J 3/38; H02J 3/381; H02J 2300/28; H02J 2300/24
See application file for complete search history.

(56) References Cited

U.S. PATENT DOCUMENTS

2012/0173035 A1   7/2012  Abe
2022/0231513 A1   7/2022  Falk et al.

FOREIGN PATENT DOCUMENTS

CA     3117684 A1 * 11/2021  ........... G05B 13/048
CN     108988374 A   12/2018
(Continued)

OTHER PUBLICATIONS

European Search Report; International Application No. EP21201519; International Filing Date: Oct. 7, 2021; Date of mailing: Mar. 18, 2022; 8 pages.

(Continued)

*Primary Examiner* — Robert L Deberadinis
(74) *Attorney, Agent, or Firm* — Cantor Colburn LLP; Mihaela Daniela Hofner

(57) ABSTRACT

A power conversion system includes an electrical generator operable to generate an electrical power and an electrical transmission system that is operable to transmit the electrical power from the electrical generator, the electrical transmission system having a maximum physical power transmission rate. A flexible load is operable in response to the receipt of the electrical power from the electrical transmission system to convert a portion of the electrical power into a form of stored energy. The electrical transmission system is separate from any grid code regulated systems, and the electrical transmission system is configured to transmit electrical power from the electrical generator to the flexible load at a rate that is 75 percent to 100 percent of the maximum physical power transmission rate.

15 Claims, 3 Drawing Sheets

(56) References Cited

FOREIGN PATENT DOCUMENTS

| | | |
|---|---|---|
| CN | 113049909 A | 6/2021 |
| DE | 102019127198 A1 | 4/2021 |
| WO | 2019246433 A1 | 12/2019 |
| WO | 2023057559 A1 | 4/2023 |

OTHER PUBLICATIONS

International Preliminary Report of Patentability (IPRP); International Application No. PCT/EP2022/077798 ; International Filing Date: Oct. 6, 2022; Date of mailing: Jan. 5, 2024, 40 pages.
PCT International Search Report and Written Opinion of International Searching Authority mailed Feb. 16, 2023 corresponding to PCT International Application No. PCT/EP2022/077798; filed Oct. 6, 2022. 15 pages.

\* cited by examiner

ELECTRICAL TRANSMISSION SYSTEM FOR FLEXIBLE CONSUMERS

BACKGROUND

Electrical power generation and delivery often includes power sources or generators that are remotely located from the loads or customers that they serve. An electrical transmission system, or grid is established to transmit or deliver that electrical power to the various loads. Many loads are very sensitive to the voltage, frequency, and phase of the electrical power being delivered. Because of these sensitive loads, the electrical transmission system has many rules, regulations, and requirements to assure that the power being delivered does not significantly deviate from the desired voltage, frequency, or phase. In addition, features are often included to further condition the power being delivered and to enhance the reliability of the entire system. These rules, regulations, requirements, and additional features greatly increase the cost of the electrical power being delivered and reduce the capacity of the electrical transmission system when compared to physical limits of the system. In addition, for some types of loads, these rules, regulations, requirements, and additional features are not necessary.

WO 2019/246433 A1 relates to a DC power distribution system comprising a power supply that converts grid-supplied AC voltage to DC voltage for use by an electrosynthetic cell.

CN 108988374 A relates to an optimized configuration method for position of a flexible direct current interconnected interface device in a transmission cross section. After the flexible DC interconnection device is arranged at an AC line, the transmission capacity of an AC cross section of the transmission cross section, the transmission power limit of the flexible DC interconnection device, and the transmission capacity of the transmission section are calculated.

US 2012/0173035 A1 relates to a multi-terminal power conversion device, a multi-terminal power transfer device, and a power network system which allows an existing power grid to be divided into a plurality of power grids that can be interconnected together and operated stably via existing or new transmission lines.

CN 113049909 A relates to a method and a system for dynamic capacity increase of overhead transmission lines based on distributed optical fiber.

DE 10 2019 127 198 A1 relates to the operation of an energy generating facility having a plurality of DC generators coupled via respective DC/DC converters to a common DC load.

BRIEF SUMMARY

In one aspect, a power conversion system includes an electrical generator operable to generate an electrical power and an electrical transmission system that is operable to transmit the electrical power from the electrical generator, the electrical transmission system having a maximum physical power transmission rate limited only by the physical characteristics of the transmission system. A flexible load is operable in response to the receipt of the electrical power from the electrical transmission system to convert a portion of the electrical power into a form of stored energy. The electrical transmission system is an island system not connected to any grid code regulated systems, and the electrical transmission system is configured to transmit AC electrical power from the electrical generator to the flexible load at a rate that is 75 percent to 100 percent of the maximum physical power transmission rate.

The electrical generator may include at least one of a wind turbine and a solar power source.

The electrical transmission system may include a first set of transmission lines capable of delivering electrical power and a second set of transmission lines capable of delivering electrical power, wherein the first set of transmission lines and the second set of transmission lines together define the maximum physical power transmission rate, and wherein both the first set of transmission lines and the second set of transmission lines are used to transmit power at the maximum physical power transmission rate.

The electrical transmission system may include an inverter operable to receive the electrical power from the electrical generator and operable to output the electrical power with a desired frequency and at a desired voltage.

The power conversion system may further include a buffer coupled to the flexible load and operable to absorb energy from one of the electrical transmission system and the flexible load.

The electrical transmission system may be operable to transmit power having at least one of a frequency between 10 and 40 Hz, a frequency between 70 and 1000 Hz, and an AC wave form that is non-sinusoidal. In other words, the electrical transmission system may transmit power as a non-sinusoidal wave form at any frequency or as a sinusoidal or non-sinusoidal wave form within the frequency range of 10 and 40 Hz or 70 and 1000 Hz.

The maximum physical power transmission rate may vary with a temperature of the electrical transmission system and where the electrical transmission system operates between 75% and 100% of a temperature adjusted maximum physical power transmission rate.

The flexible load may include an electrolyzer operable to produce a first quantity of hydrogen in response to the receipt of between 90 percent and 100 percent of the electrical power. The power conversion system may further include a buffer operable to receive and store the first quantity of hydrogen at a pressure greater than one bar, and a hydrogen consumer operable to produce an output product in response to the receipt of a second quantity of hydrogen from the buffer, the second quantity of hydrogen being less than the first quantity of hydrogen.

The electrical power may be transmitted at a rate that is 85 percent to 100 percent of the maximum physical power transmission rate.

The power conversion system transmits electrical power as AC electrical power.

The power conversion system may store a first quantity of hydrogen at a pressure between 30 bar and 300 bar.

The flexible load may include a hydrogen consumer that includes one of a power generation device, an ammonia manufacturing system, a fuel cell, and an e-fuel production system.

In another aspect, a method for operating a power conversion system includes operating an electrical generator to generate an electrical power and operating an electrical transmission system to transmit the electrical power from the electrical generator, the electrical transmission system having a maximum physical power transmission rate, limited only by the physical characteristics of the transmission system. The method also includes operating a flexible load in response to the receipt of the electrical power to convert a portion of the electrical power into a form of stored energy, and configuring the electrical transmission system to be an island system not connected to any grid code regulated systems, and to transmit AC electrical power from the electrical generator to the flexible load at a rate that is between 75 and 100 percent of the maximum physical power transmission rate of the electrical transmission system.

The method may further include transmitting the electrical power as AC electrical power having at least one of a frequency between 10 and 40 Hz, a frequency between 70 and 1000 Hz, and an AC wave form that is non-sinusoidal.

The hydrogen consumer may include one of a fuel cell and an e-fuel production system.

The foregoing has broadly outlined some of the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the scope of the disclosure in its broadest form.

Also, before undertaking the Detailed Description below, it should be understood that various definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

Other technical features may be readily apparent to one skilled in the art from the following figures, descriptions, and claims.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
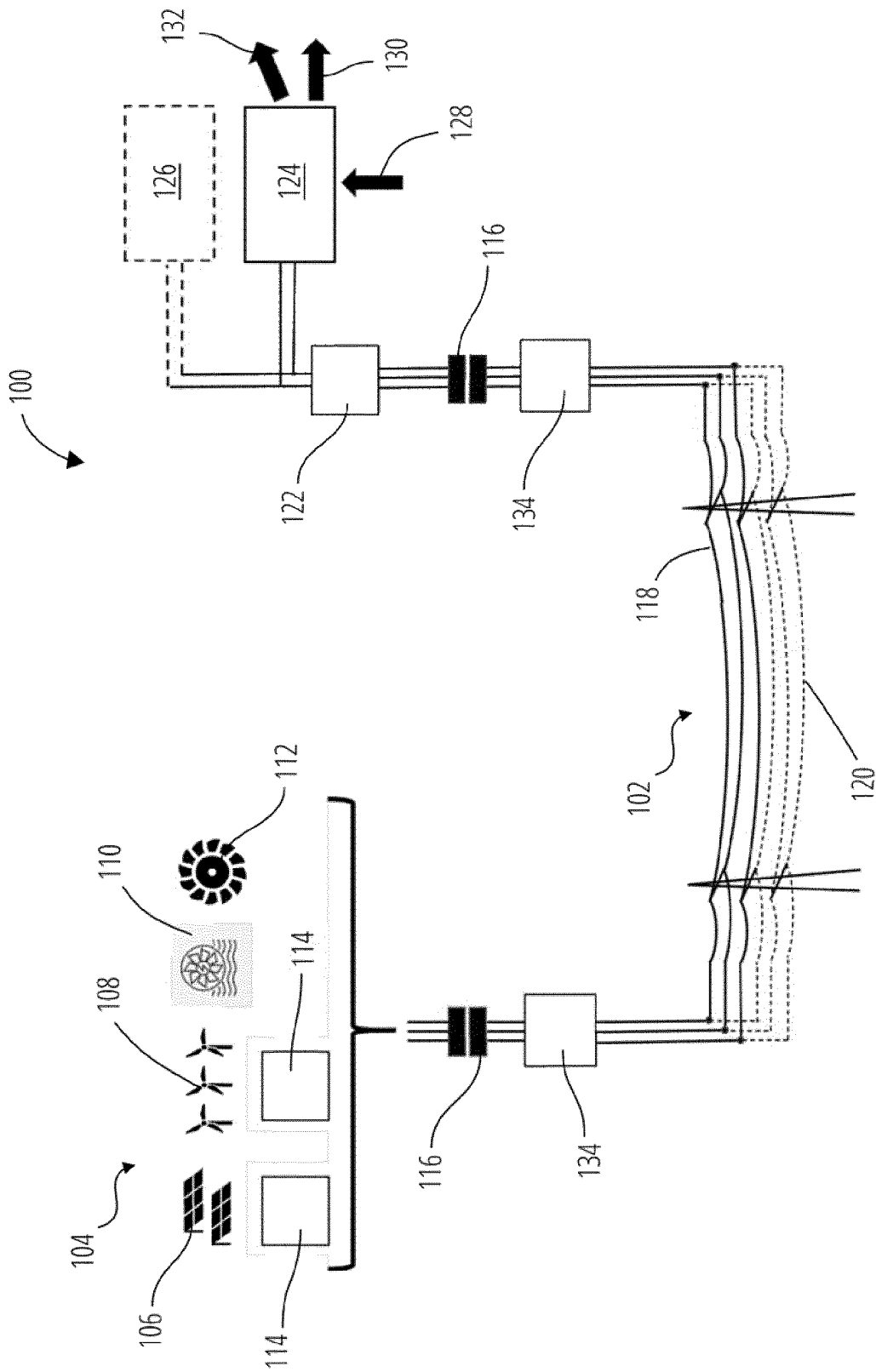
FIG. 1 schematically illustrates a power transmission system arranged to provide electrical power to flexible consumers of electrical power.

Before any embodiments of the invention are explained in detail, it is to be understood that the invention is not limited in its application to the details of construction and the arrangement of components set forth in this description or illustrated in the following drawings. The invention is capable of other embodiments and of being practiced or of being carried out in various ways. Also, it is to be understood that the phraseology and terminology used herein is for the purpose of description and should not be regarded as limiting.

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Also, it should be understood that the words or phrases used herein should be construed broadly, unless expressly limited in some examples. For example, the terms "including," "having," and "comprising," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Furthermore, while multiple embodiments or constructions may be described herein, any features, methods, steps, components, etc. described with regard to one embodiment are equally applicable to other embodiments absent a specific statement to the contrary.

Also, although the terms "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

In addition, the term "adjacent to" may mean that an element is relatively near to but not in contact with a further element or that the element is in contact with the further portion, unless the context clearly indicates otherwise. Further, the phrase "based on" is intended to mean "based, at least in part, on" unless explicitly stated otherwise. Terms "about" or "substantially" or like terms are intended to cover variations in a value that are within normal industry manufacturing tolerances for that dimension. If no industry standard is available, a variation of twenty percent would fall within the meaning of these terms unless otherwise stated.

With reference to FIG. 1, a power conversion system 100 is illustrated in conjunction with an existing electrical transmission system 102 or electrical grid. The power conversion system 100 includes an electrical generator 104 that operates to provide electrical power (i.e., an electrical current, at a non-zero voltage, and/or at a desired frequency). Electrical power can be delivered to the electrical transmission system 102 using a number of different electrical generators 104. As illustrated in FIG. 1, these electrical generators 104 could include photovoltaic (PV) 106, wind 108, hydro 110, and/or nuclear 112. These electrical generators 104 are often referred to as "green" sources of energy as they do not emit large quantities of greenhouse gases (e.g., carbon dioxide, methane, water vapor, etc.). However, it should be understood that other electrical generators 104 such as gas turbines, fossil fueled steam turbines, and the like can also operate to provide electrical power to the electrical transmission system 102.

In most cases, the electrical generators 104 are located remotely with respect to the loads that they power. As such, it is preferable to transmit the electrical power as high voltage alternating or direct current power. To accomplish this, electrical generators 104 that generate direct current power include one or more inverters 114 that operate to convert the generated electrical power to a power suitable for transmission by the electrical transmission system 102. One or more transformers 116 (in series or in parallel) may also be included to convert the electrical power to a desired voltage for transmission via the electrical transmission system 102.

If the electrical transmission system 102 was part of a regulated transmission system, the electrical transmission system would include transmission lines 118 that are sized and arranged to transmit the electrical power up to a maximum power transmission rate that is significantly below the physically possible transmission rate due to the provision of redundancies in classical grid systems (i.e., grid code regulated systems) and the very narrow allowed operating ranges of the grid parameters. In grid code regulated systems these regulations, requirements, and limitations are required to assure the delivery of a uniform supply characteristic throughout the entire system. As an example, the transmission lines 118 may be the limiting factor in the electrical transmission system 102 such that the maximum power transmission rate is governed by the available current density that the used transmission lines 118 can support, keeping in mind that some lines are used as redundancy reserve for full resilience. In some cases, the insulation of the wires limits operating voltage and/or frequency while other cases may be limited by the conductors in the wires. In most electrical transmission systems 102, the transmission lines 118 are arranged to conduct three-phase alternating current power at a high-voltage (e.g., 60 Hz, greater than 500 volts). In grid code regulated transmission systems, the electrical transmission system 102 would be required to provide a certain level of reliability or redundancy. To assure this level of reliability, the electrical transmission system 102 may employ the transmission lines 118 under normal conditions to deliver the electrical power and may further include one or more redundant transmission lines 120 that are provided to deliver electrical power should the transmission lines 118 fail or not have the capacity necessary to meet the required load.

Additional transformers 116 are provided near the load to convert or reduce the voltage of the electrical power to a value that is more proper for the various loads. The transformers 116 could include multiple transformers in parallel or in series or may include a single transformer 116.

For some loads, a direct current may be desirable. In these cases, one or more rectifiers 122 may be provided to convert the electrical power from the alternating current to a direct current. FIG. 1 illustrates two loads that are of particular interest for the power conversion system 100. However, it should be understood that the electrical transmission system 102 illustrated in FIG. 1 is capable of and in fact is specifically arranged to provide well-controlled (i.e., very narrow voltage and frequency range of operation) electrical power to virtually any electrical load. In cases where these loads are flexible loads, the existing grid system (i.e., grid code regulated system) does not take full advantage of the flexibility of these loads. The two loads illustrated in FIG. 1 are flexible consumers or flexible loads in that they are not sensitive to the frequency or voltage of the power delivered. The illustrated loads include an electrolyzer 124 and an electrothermal storage system 126. The electrothermal storage system 126 is a system that uses electrical power to generate heat that is stored in thermally absorbent materials such as rock, ceramics, salts, water, phase-change materials, and the like. The heat can be extracted and converted to electrical energy when excess electrical energy might be required.

The electrolyzer 124 is a device that uses direct current (DC) electricity to drive an otherwise non-occurring chemical reaction. Thus, the electrolyzer 124 could be considered a molecular generator or flexible load that generates an energy storing compound such as e.g., hydrogen and oxygen out of water, carbon monoxide or hydrocarbons out of water and carbon oxides or ammonia and oxygen out of nitrogen and water. In this context, the electrolyzer 124 may use direct current to decompose water 128 into hydrogen 130 and oxygen 132. In one construction, a polymer electrolyte membrane (PEM) electrolyzer is employed. PEM electrolyzers include a cell equipped with a solid polymer electrolyte (SPE) that is responsible for the conduction of protons, separation of product gases, and electrical insulation of the electrodes. Of course, other flexible loads such as energy storage devices (e.g., batteries) could be employed in place of or in conjunction with the illustrated flexible loads. The nature of the flexible load is not critical so long as the flexible load is capable of operation with varying power inputs. For example, the power level itself may fluctuate or the voltage or frequency may fluctuate. In addition, it is preferred that the flexible load operate to convert a portion of the electrical power to a form of stored energy (e.g., chemical such as hydrogen production, mechanical such as flywheels, gravitational such as pumped-storage hydro, electrical such as batteries, and the like).

Typical electrical transmission systems 102 have regulations and grid stabilizers 134 that restrict the amount of power that they can transmit. For example, typical electrical transmission systems 102 must maintain the frequency and the voltage of the delivered power within very narrow ranges. These regulations require the electrical transmission system 102 to maintain a certain reserve that would allow for the very fast (instantaneous) increase in load or decrease in load without a fluctuation of the voltage or frequency outside of the regulated limits. This type of stable operation can often be maintained when the electrical generators 104 include synchronous generators operating with reserve power. As the electrical transmission system 102 adds more of these types of fluctuating electrical generators 104, the use of synchronous generators to stabilize the power conversion system 100 becomes more difficult.

These requirements, especially the n-1 requirement (i.e., a rule or regulation that requires at least one transmission line be unused as a reserve), reduce the total quantity of electrical power that can be delivered via the electrical transmission system 102 such that the power delivered is often well below (i.e., between 50% and 70%) the maximum physical power transmission rate of the electrical transmission system 102. These limitations greatly increase the operating, construction, and maintenance costs for the electrical transmission system 102 and reduce the quantity of hydrogen 130 that could be produced by the electrolyzer 124.

One advantage of the flexible loads mentioned (e.g., electrolyzers) is their ability to operate with a certain degree of fluctuation of the current densities. Examples of these fluctuations include a reduction of the current to 10% of nominal value or increase to 150% of the nominal value. In addition, flexible loads can sustain a temporary interruption of the power supplied to them without damage or negative effects. This can result in reduced operational costs, especially for electrolyzers 124 coupled with very dynamic electrical generators 104 such as wind 108 and solar (i.e., photovoltaic (PV) 106), where fluctuations in energy output would otherwise result in unused energy since the transmission system is limited.

Figure 2:
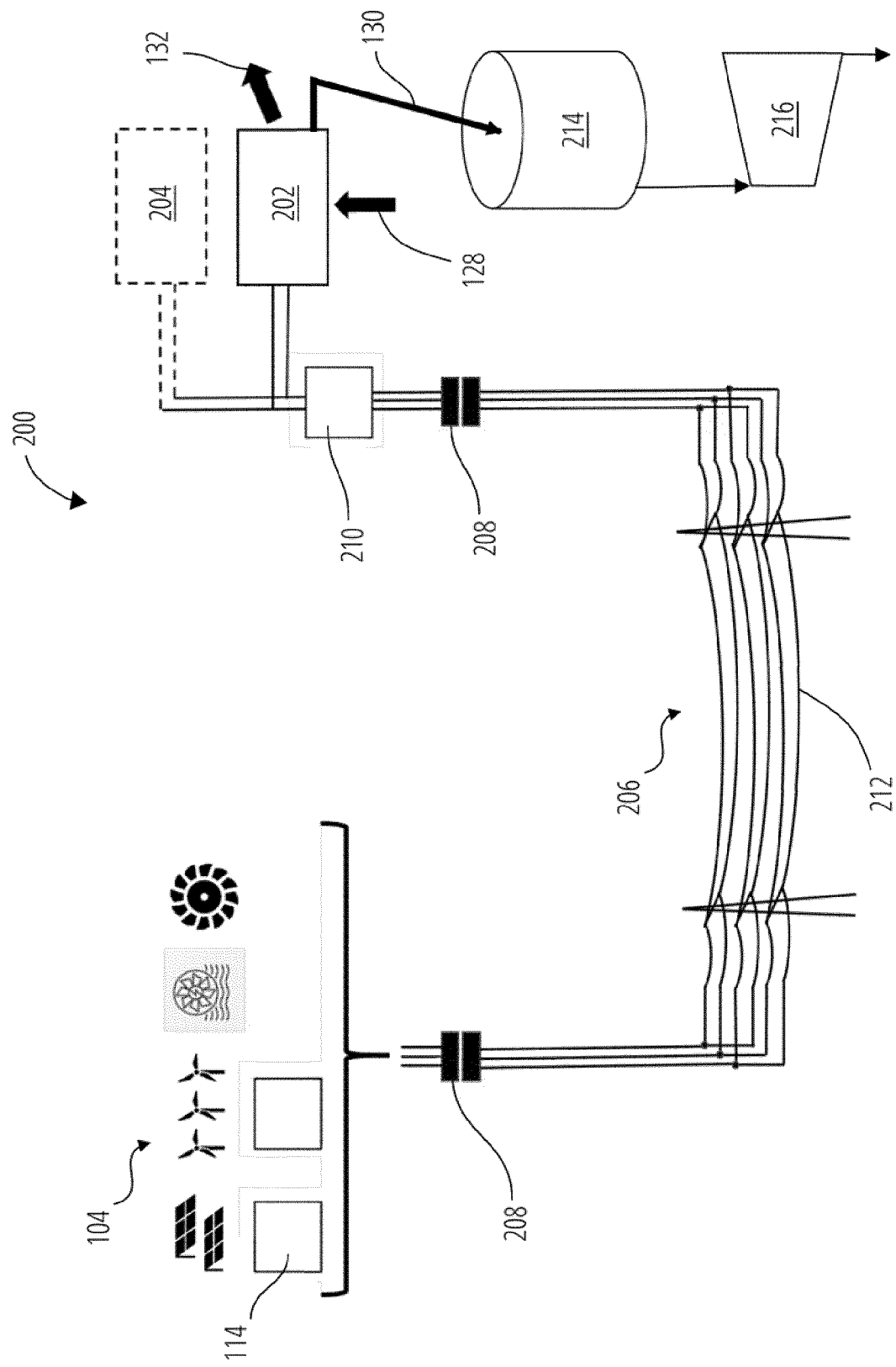
FIG. 2 schematically illustrates an improved power transmission system arranged to provide electrical power to flexible consumers of electrical power.

FIG. 2 illustrates an improved power conversion system 200 that uses electrical power generated by the same electrical generators 104 and provides that power to one or more flexible loads while extending the operating range of the transmission system in terms of voltage, current, and frequency limitations used to reach a maximum overall transmission capacity. It should be noted that the power conversion system 200 is referred to as an island system in that it is not connected to a regulated external grid. Often islands are thought of as small versions of the larger, more familiar electrical grid. However, the power conversion system 200 described herein can be more accurately thought of as an isolated or independent transmission system between one or more sources of power and one or more consumers of power. Thus, the power conversion system 200 does not connect to the familiar, regulated power grid, but rather operates independent of the power grid, as that term would be understood.

FIG. 2 illustrates the power being delivered to flexible loads that include one or both of an electrolyzer 202 and preferably a PEM electrolyzer and an electrothermal storage system 204. It should be noted that the electrolyzer 202 could include a single electrolyzer 202 or a plurality of different electrolyzer units that operate in parallel to generate the desired quantity of hydrogen 130. Similarly, the electrothermal storage system 204 could include a single electrothermal storage system 204 or a plurality of similar or different electrothermal storage systems 204 that operate in parallel. It should be understood that in addition to or in conjunction with the flexible loads illustrated in FIG. 2, flexible loads could include all variants of electrolysis systems, preferably with a gas storage system after the electrolyzer, electrical heaters, preferably when equipped with a thermal storage system, electrical coolers, electrical charging systems (e.g., for electric cars), and electrical motors, especially where the output mechanical energy is used to load a storage device such as a pumped-storage hydro plant.

To transmit the power from the electrical generator 104 to the loads such as the illustrated electrolyzer 202 and electrothermal storage system 204, the improved power conversion system 200 includes an efficient transmission system 206. The efficient transmission system 206 includes a transformer 208 that may include one or more physical transformers in series and/or parallel and that operate to increase the voltage of the electrical power received from the electrical generators 104 to enhance the efficiency of the transmission of the electrical power. The illustrated power conversion system 200 transmits high-voltage AC power as this is more efficient, particularly over long distances. Another transformer 208 that may include one or more physical transformers in series and/or parallel is positioned near the electrolyzer 202 and the electrothermal storage system 204 and operates to reduce the voltage to a level more suitable for use by the electrolyzer 202 and/or the electrothermal storage system 204. Since both the electrolyzer 202 and the electrothermal storage system 204 operate using direct current power, a rectifier 210 is provided to convert the alternating current electrical power from the efficient transmission system 206 to direct current electrical power suitable for use by the electrolyzer 202 and the electrothermal storage system 204.

The efficient transmission system 206 is arranged to deliver power to flexible loads such that many of the requirements that are imposed upon the electrical transmission system 102 of FIG. 1 are not needed and can be eliminated. Transmission parameters such as voltage, frequency and shape of electrical current for transmission are only limited by technical boundaries of the efficient transmission system 206. Arbitrary AC frequency (e.g., a frequency between 10 and 40 Hz or between 70 and 1000 Hz) and shape (e.g., non-sinusoidal such as square wave or saw tooth) can be accommodated for transmission (within the limits of applied components) in conjunction with specifically designed power electronic components at the load that can take these fluctuations to reduce the need for power conditioning components that may reduce transmission capacity.

The efficient transmission system 206 is capable of operating with input power that fluctuates broadly in both frequency and voltage (e.g., 10-1000 Hz, or voltage variation over one decade (e.g., 50-500 kV). In addition, the power is transmitted as an AC current with frequencies similar to existing grid systems (e.g., 50 or 60 Hz) or at much lower frequencies (e.g., 16⅔ Hz) to minimize the capacitive/inductive effects which leads to reduced reactive power needs. Alternatively, higher frequencies (e.g., 100 Hz, 200 Hz, etc.) could be employed with the advantage of reducing component size by providing for example better magnetic coupling which leads to smaller transformers.

The efficient transmission system 206 includes fully utilized transmission lines 212 that are similar to those described with regard to FIG. 1. The fully utilized transmission lines 212 do not include redundant transmission lines 120 but rather use all the available lines to transmit power. In other words, the efficient transmission system 206 includes a first set of transmission lines that is full capable of delivering power and a second separate set of transmission lines (formerly redundant lines) that are also capable of delivering power. Thus, the efficient transmission system 206 is capable of operating at a level between 75% and 100% of the maximum physical power transmission rate of the transmission line 118 using the same quantity of lines in the fully utilized transmission lines 212. In other constructions, operating levels of 85% to 100% are possible with systems operating between 90% and 100% also being possible. In addition, using the formerly redundant transmission lines 120 to transmit power potentially doubles the maximum physical power transmission rate when compared to the regulated transmission lines 118, while the alternative of eliminating the redundant transmission lines 120 reduces the cost of construction, operation, and maintenance of the efficient transmission system 206. Thus, an existing grid or electrical transmission system 102 could be converted to the efficient transmission system 206 or a new efficient transmission system 206 could be constructed as may be desired.

Other features and arrangements may also be employed to further enhance the overall efficiency of the efficient transmission system 206. For example, the efficient transmission system 206 may utilize a temperature dependent maximum capacity for the transmission lines 118. Thus, when the ambient temperature is low or the wind is blowing to provide an additional cooling effect, the capacity of the transmission lines 118 may be further increased. In addition, power poles that may be employed to support the wires for above ground transmission are arranged to include the maximum quantity of wires possible. Alternatively, underground (or underwater) transmission lines could be employed.

The efficient transmission system 206 is capable of use for the transmission of power over virtually any distance. However, to further enhance the efficiency, the voltage of the power being transmitted may be varied as a function of the length of the transmission lines 118 or the distance between the flexible loads and the electrical generators 104. For example, one arrangement of the efficient transmission system 206 may be transmitting power a very short distance (e.g., zero to 20 km). In this arrangement, the efficient transmission system 206 may operate at a voltage between 1 kV and 20 kV. In applications where the efficient transmission system 206 is used to transmit power a medium distance (e.g., 20 km to 200 km) a voltage of between 20 kV to 100 kV may be employed. For long distances (e.g., 200 km to 5000 km) the efficient transmission system 206 may employ a voltage between 100 kV to 400 kV with some application operating up to 1000 kV.

The improved power conversion system 200 can be further enhanced with the inclusion of electrical storage devices (e.g., batteries, grid booster) at the electrical generators 104 or near the flexible loads to decouple the energy need of the flexible loads from the fluctuating energy generation provided by the electrical generators 104. Renewable energy generation can have significant fluctuation such that the peak capacity of the efficient transmission system 206 will only be used for part of the time. Energy storage at the site of the generation will buffer the volatile generation (e.g., smoothing PV power over one day) to get a flat load characteristic that enables the utilization of the maximum transmission capacity during operation (maximum utilization of the grid system).

The improved power conversion system 200 can be further stabilized by providing a buffer in the form of a high-capacity hydrogen tank 214 in FIG. 2 that provides for the storage of high-pressure (e.g., 60-100 Bar or greater) hydrogen 130. The hydrogen tank 214 operates as a buffer that then feeds a gas turbine 216, or other hydrogen consumer (e.g., chemical process, industrial process, agricultural process, etc.) that combusts, or otherwise uses the hydrogen 130 to produce electrical power or some other product or compound. During brief periods where the electrical power produced by the electrical generator 104 drops (e.g., clouds pass over the photovoltaic (PV) 106 or the wind speed drops) the reduced hydrogen production does not affect the operation of the gas turbine 216 or other consumer as the hydrogen tank 214 contains a sufficient supply of high-pressure hydrogen 130 to maintain stable operation. The inverse is also true. A sudden increase in wind speed can result in a sudden increase in the production of hydrogen 130. Rather, than feeding the excess to the gas turbine 216 or other consumer the hydrogen tank 214 absorbs the extra hydrogen by slightly increasing its internal pressure.

The use of a buffer enhances the ability of the improved power conversion system 200 to operate during a temporary shortfall of power that may occur when the redundancy line and strict grid limitations are discarded. It should be noted that while a single hydrogen tank 214 and a gas turbine 216 or other consumer are described, multiple hydrogen tanks 214 or multiple gas turbines 216 and/or other consumers could be employed. In fact, the hydrogen tank 214 does not necessarily need to include a tank but can include any feature or component capable of containing a large quantity of high-pressure gas such as pipes or caverns. As such, the term "tank" as used in relation to the hydrogen tank means simply a component or feature capable of storing a quantity of hydrogen at an elevated pressure (e.g., 2-500 Bar).

It should be noted that some flexible loads include a buffer built into the load itself or that naturally act as a buffer. For example, batteries or charging systems are able to absorb or react to changes in input power and as such have a built-in buffer.

Figure 3:
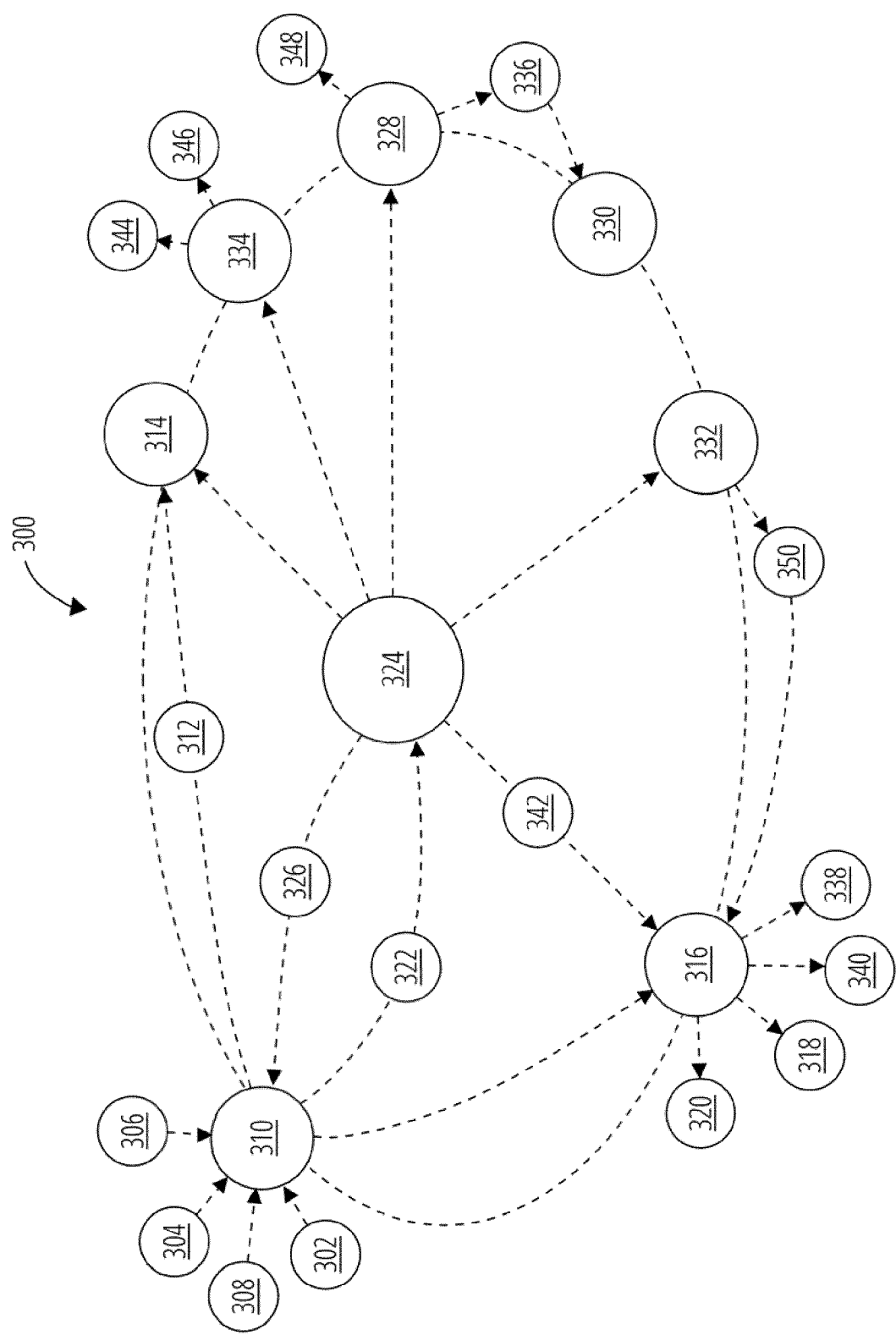
FIG. 3 illustrates a portion of one possible hydrogen economy.

While FIG. 2 illustrates the hydrogen 130 being stored in a hydrogen tank 214 and consumed by one or more consumers such as hydrogen powered gas turbines 216, other uses for the hydrogen 130 are possible. FIG. 3 illustrates a portion of one possible green hydrogen economy 300 that includes a number of hydrogen consumers that consume hydrogen to produce an output product (e.g., a feedstock resulting from a chemical reaction) but also heat (e.g. by simply burning it in a boiler), electricity (e.g. burning in a boiler to heat steam and expand in a turbine), etc. as illustrated in FIG. 3). The green hydrogen economy 300 starts with the use of green energy such as but not limited to wind 302, solar 304, hydro 306, and nuclear 308 to generate green power 310 in the form of electrical power. The electrical power can be used directly to power loads such as power heat pumps/chillers 312 for residential, commercial, or industrial HVAC 314 (heating, ventilation, and air conditioning). In addition, the electrical power can be used directly for mobility 316. Specifically, the electrical power can be used to facilitate transportation on the road 318 by charging batteries for cars, trucks, buses and the like. In addition, the electrical power can be used directly for transportation by rail 320 by powering electric trains. A portion of the green power 310 can be directed to electrolyzers 322 that operate to produce hydrogen and in particular e-hydrogen or e-$H_2$ 324. The e-$H_2$ 324 can then be used to power one or more electricity producing machines 326 (e.g., gas turbines) that consume the hydrogen to produce green power 310 in a re-electrification process. In addition, the e-$H_2$ 324 may be used for HVAC 314 or other heating or cooling applications, in the chemical industry 328, in agriculture 330, in the petrochemical industry 332, in mobility 316, and in other industries 334. For example, steel mills or (petro) chemical plants that are located apart from the (renewable) energy generation site and need significant energy for the operation of their H2 electrolyzers or to generate electrical (decarbonized) heat could benefit from the improved power conversion system 200.

In HVAC 314 applications, the e-$H_2$ 324 can be combusted in place of other fuels such as natural gas to provide heat for commercial, residential, or industrial buildings or processes. In the chemical industry 328, e-$H_2$ 324 can be used as a base chemical for some processes and can be used to manufacture e-ammonia that might be used to produce e-fertilizers 336 that are suited for use in the agriculture 330 industry. In the petrochemical industry 332 e-$H_2$ 324 can be used to synthesis e-methane or other e-fuels that are suitable for use in applications related to mobility 316. Specifically, the e-fuels can be used in combustion engines used in aviation 338, marine 340, or road 318 applications in place of the existing carbon-based fuels. Alternatively, the e-$H_2$ 324 can be used in one or more fuel cells 342 to produce electricity or power for use in mobility 316. Other industries 334 that could benefit from e-$H_2$ 324 include industries related to the manufacture of steel 344 as well as food and beverage 346 industries. Of course, other applications, known and as yet unknown, for e-H$_2$ 324 are possible and could benefit from the improved power conversion system 200. It should be understood that the improved power conversion system 200 preferably operates separate from any grid code regulated systems. However, the improved power conversion system 200 could include an efficient transmission system 206 that operates as a single line stand alone system or in combination with other such lines as a meshed grid system to provide an independent layer structure and maximize the transmission capacity. In addition, the system may work as a unidirectional transmission system or as a bidirectional transmission system.

Shifting the multi-infeed principle of a meshed grid by utilizing the inherent storage capability of the gas system achieving reliability without needing devices for load flow control While several electrical generators 104 or sources of power have been described, it should be clear that virtually any renewable energy source (e.g., wind, photovoltaic (PV) 106, hydro, geothermal, biomass, concentrated solar power, etc.). In addition, non-renewable energy sources could be employed with carbon dioxide free sources (e.g., nuclear, fusion, etc.). Of course, energy sources that are fossil-based (e.g., methane, etc.) could also be used for heat pumps or BEV charging. Finally, the source of power could include stored electrical, chemical or gravitational energy (e.g., batteries, ammonia for electrification, pumped hydro, etc.). Any of these power sources could be used alone or in conjunction with any others in the improved power conversion system 200.

It should also be noted that the efficient transmission system 206 has been largely described as an AC power transmission system as high-voltage AC transmission over long distances is more efficient than DC transmission.

The power conversion system 200 is capable of delivering significantly more electrical power to loads than the power conversion system 100. The use of isolated fully utilized transmission lines 212 rather than grid regulated transmission lines allows for transmission of power at a rate between 75 and 100 percent of the maximum physical power transmission rate (i.e., the rate limited only by the physical characteristics of the transmission system), whereas the grid regulated transmission lines are further limited by the grid regulations that require strict voltage, control, frequency control, wave form control, and redundancy, in addition to any physical limitations.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. A power conversion system comprising:
    an electrical generator operable to generate an electrical power;
    an electrical transmission system is operable to transmit the electrical power from the electrical generator, the electrical transmission system having a maximum physical power transmission rate;
    a flexible load operable in response to the receipt of the electrical power from the electrical transmission system to convert a portion of the electrical power into a form of stored energy; and
    a buffer coupled to the flexible load and operable to absorb energy from one of the electrical transmission system and the flexible load,
    wherein the electrical transmission system is separate from any grid code regulated systems, and the electrical transmission system is configured to transmit electrical power from the electrical generator to the flexible load at a rate that is 75 percent to 100 percent of the maximum physical power transmission rate.

2. The power conversion system of claim 1, wherein the electrical generator includes at least one of a wind turbine and a solar power source.

3. The power conversion system of claim 1, wherein the electrical transmission system includes a first set of transmission lines capable of delivering electrical power and a second set of transmission lines capable of delivering electrical power, and wherein the first set of transmission lines and the second set of transmission lines together define the maximum physical power transmission rate, and wherein both the first set of transmission lines and the second set of transmission lines are used to transmit power at the maximum physical power transmission rate.

4. The power conversion system of claim 1, wherein the electrical transmission system includes an inverter operable to receive the electrical power from the electrical generator and operable to output the electrical power with a desired frequency and at a desired voltage.

5. The power conversion system of claim 1 wherein the flexible load includes at least one of a charging device, a heating device, and a cooling device and wherein the buffer is an inherent feature of the at least one of the charging device, the heating device, and the cooling device.

6. The power conversion system of claim 1, wherein the flexible load includes an electrolyzer that operates to produce hydrogen and wherein the buffer includes a hydrogen tank operable to store a first quantity of hydrogen for use by a hydrogen consumer.

7. The power conversion system of claim 6, further comprising a rectifier that receives the electrical power from the electrical transmission system and operates to output the electrical power as a direct current at a desired voltage.

8. The power conversion system of claim 6, wherein the first quantity of hydrogen is stored at a pressure between 30 bar and 300 bar.

9. The power conversion system of claim 1, wherein the electrical transmission system is operable to transmit power having at least one of a frequency between 10 and 40 Hz, a frequency between 70 and 1000 Hz, and an AC wave form that is non-sinusoidal.

10. The power conversion system of claim 1, wherein the flexible load includes an electrolyzer operable to produce a first quantity of hydrogen in response to the receipt of between 90 percent and 100 percent of the electrical power, the power conversion system further comprising a buffer operable to receive and store the first quantity of hydrogen at a pressure greater than one bar, and a hydrogen consumer operable to produce an output product in response to the receipt of a second quantity of hydrogen from the buffer, the second quantity of hydrogen being less than the first quantity of hydrogen.

11. The power conversion system of claim 1, wherein the electrical power is transmitted at a rate that is 85 percent to 100 percent of the maximum physical power transmission rate.

12. The power conversion system of claim 1, wherein the electrical power is transmitted as AC electrical power.

13. A power conversion system comprising:
an electrical generator operable to generate an electrical power;
an electrical transmission system is operable to transmit the electrical power from the electrical generator, the electrical transmission system having a maximum physical power transmission rate; and
a flexible load operable in response to the receipt of the electrical power from the electrical transmission system to convert a portion of the electrical power into a form of stored energy,
wherein the electrical transmission system is separate from any grid code regulated systems, and the electrical transmission system is configured to transmit electrical power from the electrical generator to the flexible load at a rate that is 75 percent to 100 percent of the maximum physical power transmission rate, and
wherein the maximum physical power transmission rate varies with a temperature of the electrical transmission system and wherein the electrical transmission system operates between 75% and 100% of a temperature adjusted maximum physical power transmission rate.

14. A method for operating a power conversion system, the method comprising:
operating an electrical generator to generate an electrical power;
operating an electrical transmission system to transmit the electrical power from the electrical generator, the electrical transmission system having a maximum physical power transmission rate,
operating a flexible load in response to the receipt of the electrical power to convert a portion of the electrical power into a form of stored energy;
providing a buffer coupled to the flexible load and operable to absorb energy from one of the electrical transmission system and the flexible load; and
configuring the electrical transmission system to be separate from any grid code regulated systems, and to transmit electrical power from the electrical generator (104) to the flexible load at a rate that is between 75 and 100 percent of the maximum physical power transmission rate of the electrical transmission system.

15. The method of claim 14, further comprising transmitting the electrical power as AC electrical power having at least one of a frequency between 10 and 40 Hz, a frequency between 70 and 1000 Hz, and an AC wave form that is non-sinusoidal.

* * * * *